United States Patent [19]

Hung

[11] Patent Number: 5,004,345
[45] Date of Patent: Apr. 2, 1991

[54] DUAL-LENS SHEARING INTERFEROMETER

[76] Inventor: Yau Y. Hung, 625 Cambridge Dr., Rochester, Mich. 48063

[21] Appl. No.: 279,820

[22] Filed: Dec. 5, 1988

[51] Int. Cl.$^5$ ............................................. G01B 9/02
[52] U.S. Cl. .................... 356/353; 356/35.5; 356/359
[58] Field of Search ............ 356/353, 356, 359, 35.5; 73/800

[56] References Cited

U.S. PATENT DOCUMENTS

| | | |
|---|---|---|
| 3,218,916 | 11/1965 | Saunders . |
| 3,487,227 | 12/1969 | Kinzly . |
| 3,532,431 | 10/1970 | Bryngdahl . |
| 3,626,753 | 12/1971 | Aprahamian . |
| 3,767,308 | 10/1973 | Duffy ............................... 356/359 |
| 3,816,649 | 6/1974 | Butters . |
| 3,829,219 | 8/1974 | Wyant . |
| 3,849,003 | 11/1974 | Velzel . |
| 3,870,414 | 3/1975 | Duffy ............................... 356/359 |
| 3,911,729 | 10/1975 | Collins . |
| 3,943,278 | 3/1976 | Ramsey . |
| 4,118,124 | 10/1978 | Matsuda . |
| 4,139,302 | 2/1979 | Hung . |
| 4,523,469 | 6/1985 | Scott . |
| 4,541,280 | 9/1985 | Cielo . |
| 4,633,715 | 1/1987 | Monchalin . |
| 4,650,302 | 3/1987 | Grant . |
| 4,690,552 | 9/1987 | Grant . |

OTHER PUBLICATIONS

"Shearography Versus Holography in Nondestructive Testing" by Y. Y. Hung, 1986, vol. 604 Proceedings of The International Society for Optical Engineering.
Y. Y. Hung, "Shearography: A New Optical Method for Strain Measurement and Nondestructive Testing"; Optical Engineering, May/Jun. 1982, vol. 21 No. 3, pp. 391-395.
Y. Y. Hung et al., "Measurement of Slopes of Structural Deflections by Speckle-Shearing Interferometry", Experimental Mechanics, vol. 14 No. 7, Jul. 1974, pp. 281-285.
Y. Y. Hung et al., "Speckle-Shearing Interferometric Technique: a Full-Field Strain Gauge", Applied Optics, vol. 14 No. 3, Mar. 1975, pp. 618-622.

*Primary Examiner*—Samuel Turner
*Attorney, Agent, or Firm*—William H. Eilberg

[57] ABSTRACT

This invention includes a method and apparatus for nondestructive testing of objects. The invention concerns a method of practicing shearography, i.e. forming two laterally-displaced images of the test object and causing these images to interfere. The invention includes the steps of directing a beam of coherent light onto the object and directing the reflected light onto a detector, such as a photographic film. A pair of lenses, laterally-displaced from each other, are placed between the object and the detector. Both lenses produce an image of the object at the plane of the detector, and because the lenses are spaced apart, the images produced are also spaced apart. In other words, the dual lens system causes two images from two different regions on the surface of the object to meet at the image plane. These images interfere with each other to form a speckle pattern. When the object is deformed, the speckle pattern changes. Comparison of the speckle patterns with and without deformation yields information on the relative deformation of the two regions of the object. The method can be used to evaluate nondestructively the integrity of the object.

7 Claims, 2 Drawing Sheets

DUAL-LENS SHEARING INTERFEROMETER

BACKGROUND OF THE INVENTION

This invention is a method and apparatus for measuring deformation objects and for nondestructive testing, and, in particular, includes a new method of practicing the technique of shearing interferometry, or "shearography".

Conventional holographic interferometry has been used for measuring surface displacements and can be used for detecting defects in test objects. A hologram is produced by illuminating an object with coherent light, generated by a laser, and causing the light reflected from the object to interfere with a "reference beam" coming directly from the laser. The interference pattern produced by the object beam and the reference beam constitutes the hologram. The pattern can be recorded on a photographic plate, or by other means. To test the object for defects, the object is stressed, and another hologram is taken on the same photographic plate. The result is a second-order interference pattern which yields information concerning the presence or absence of defects in the object.

It has long been recognized that holography is impractical for use as a tool for measurement of displacement and nondestructive testing in an industrial environment. Producing a hologram requires a relatively complex and sensitive optical apparatus; one needs a set of mirrors to direct the object beam and reference beam in the required directions. If the mirrors are not properly aligned, no hologram will be formed.

A hologram can also be ruined by environmental disturbances. To make a hologram, one often needs special equipment to isolate the optical elements and the object from stray vibrations. This need is particularly acute when the hologram is to be made in an industrial environment or in the field. Although these requirements may be relaxed when a pulsed laser is used to record the hologram, a pulsed laser is a very delicate instrument which is not only expensive but also requires highly-skilled personnel to operate and maintain.

Another disadvantage of holography is that it requires light having a relatively high degree of coherence. The "coherent length" requirement is comparatively high, in holography, because the total path length variation of a three-dimensional object is relatively large.

Holography also has the disadvantage that it is sensitive to rigid body motion. If a test object is tilted, the effect on the hologram will be different for different points on the object. This effect is due to the fact that each point on the hologram results from a combination of a beam reflected from the object and a fixed reference beam. Rigid body motion creates unwanted fringes in a hologram, as illustrated in FIG. 9 of the article by Y. Y. Hung, entitled "Shearography: A New Optical Method for Strain Measurement and Nondestructive Testing", *Optical Engineering*, May-June 1982, pages 391-5. These fringes can obscure or obliterate the useful information contained in the hologram. A comparison of shearography versus holography in nondestructive testing is given in the article of Y. Y. Hung, entitled "Shearography versus Holography in Nondestructive Evaluation", published in *Proceedings of SPIE-The International Society for Optical Engineering*, volume 604 (1986), at page 18.

For the reasons given above, holography has been generally limited to use in laboratories. It is normally impractical to use holography as a means of analyzing thousands of mass-produced parts as they are traveling along an assembly line.

An alternative to conventional holography, in the field of nondestructive testing, is shearing interferometry, or shearography. The latter terms are used interchangeably herein. In shearing interferometry, one produces a pair of laterally-displaced images of the test object, on the same image plane. The lateral displacement of images accounts for the term "shearing". The sheared images combine to form an interference pattern. When the light used is reasonably coherent, this interference pattern appears as a random interference pattern or set of "speckles", and the pattern is therefore often called a "speckle pattern". Comparison of the speckle patterns obtained while the object is deformed and while it is not deformed yields information about the integrity of the object.

Examples of patents showing means for practicing various forms of shearing interferometry include U.S. Pat. Nos. 4,139,302, 3,532,431, 4,118,124, 3,829,219, and 3,218,916. The disclosures of the latter patents are incorporated by reference herein.

U.S. Pat. No. 4,139,302 shows a method of shearography in which the sheared images are produced by an optical wedge, placed near a portion of an imaging lens. Light reflected from each point on the object passes through the lens alone, and also through the combination of the lens and the wedge. The wedge thus produces two laterally-displaced images at a detector, and these images interfere to form a speckle pattern.

The wedge device of the above-cited patent avoids some of the problems inherent in holography, such as the need for a matched object beam and reference beam, because it uses a single laser beam to produce a pair of sheared images. But use of the wedge introduces some new problems. By its nature, the wedge distorts the images; one of the images will necessarily be tilted somewhat, and will not be parallel to the image plane. The wedge system is also not conveniently adjustable; to vary the amount of shearing, one must replace the wedge with another wedge having a different geometry. There is thus no easy way of continuously adjusting the amount of shearing. Tilting the wedge is not a practical means of adjusting the shearing because the wedge needs to be in an optimum position to achieve best results.

Moreover, the amount of shearing in the wedge shearography system is limited by the wedge angle. To produce large amounts of shear, thus allowing two distantly separated regions of the same object or two different objects to be compared, a wedge having a large angle is needed. But a wedge of large angle will produce too much distortion in the images, and will yield test results of poor quality.

The present invention provides an improved method and apparatus for practicing shearography. The invention avoids the disadvantages inherent in holography, and also solves the problems, discussed above, encountered in the use of conventional shearographic methods.

SUMMARY OF THE INVENTION

According to the method of the present invention, a beam of coherent light is directed onto a test object, and the reflected light is detected by suitable means, such as a photographic film, at the image plane. A pair of laterally-displaced lenses are placed between the object and the detector. Both lenses are capable of projecting a complete, or nearly complete, image of the object onto the detector. Because the lenses are laterally-displaced, the images produced are also laterally-displaced, or mutually "sheared". In other words, the dual-lens device causes the images of two different regions on the surface of the object to overlap in the image plane, and thus allows the deformation in the two regions to be compared. These images interfere with each other to form a speckle pattern at the image plane.

To use the invention for measuring relative surface displacements or for nondestructive testing, one obtains two speckle patterns, while the object is in a stressed condition and in an unstressed condition. Comparison of the patterns yields information on the relative displacements, due to deformation of the two regions.

It is also possible to use the invention to compare the deformations of two different objects. In this case, each of the two images that are caused to interfere by the dual-lens system originates from a different object. The fringe pattern thus generated represents the relative displacements between the two objects. If one of the objects is not deformed, the invention yields information about the absolute displacement of the deformed object.

The invention can be generalized to a multiple-lens system. A multiple-lens system comprises multiple lens-pairs. Each lens-pair allows the deformation in two different regions to be compared. Therefore, a multiple-lens system permits simultaneous comparison of multiple regions.

The invention can be used to detect flaws in objects. Since flaws in objects usually induce strain concentrations, one can use the method to reveal such flaws by looking for anomalies in the fringe pattern.

The amount of shearing can be varied by varying the separation of the lenses. Also, it is possible to use a pair of partial lenses to perform the shearing.

It is therefore an object of the invention to provide a means of measuring relative displacements of two different regions of the same object.

It is another object of the invention to provide a means of comparing displacement of two different objects.

It is another object to provide a means of measuring absolute displacement of an object due to deformation.

It is another object to provide an improved method and apparatus for nondestructive testing.

It is another object to provide an improved method for measuring relative vibrational amplitude of two steady-state vibrating objects.

It is another object to provide an improved method for practicing shearing interferometry.

It is another object to provide a method for nondestructive testing which does not have the limitations of conventional holography.

It is another object to provide a method of nondestructive testing, which method requires a comparatively simple optical apparatus, and which is more efficient and versatile than methods of the prior art.

It is another object to provide a method of nondestructive testing wherein the requirement of light intensity and coherence are less stringent than in methods of the prior art.

It is another object to provide a method of shearing interferometry in which the amount of shearing is easily and continuously adjustable.

It is another object to provide apparatus for practicing the method described above.

Other objects and advantages of the invention will be apparent to those skilled in the art, from a reading of the following brief description of the drawings, the detailed description of the invention, and the appended claims.

DETAILED DESCRIPTION OF THE INVENTION

Figure 1:
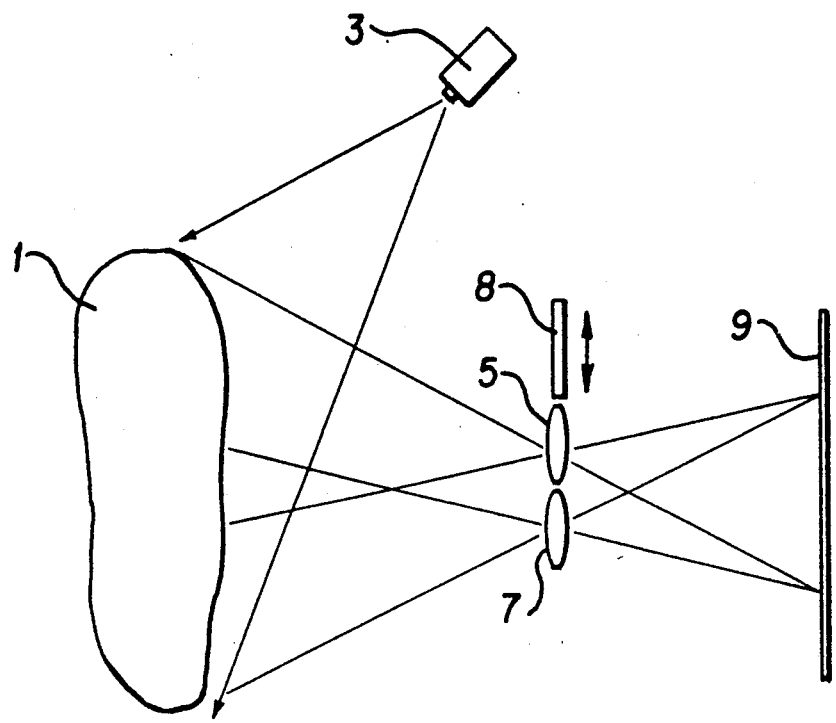
FIG. 1 is a schematic diagram showing the apparatus used to practice the shearographic method of the present invention.

FIG. 1 schematically illustrates the apparatus of the present invention. Test object 1 is illuminated with light from laser 3. Reflected light from object 1 is projected onto detector 9 by lenses 5 and 7. As shown schematically in FIG. 1, lenses 5 and 7 are spaced apart from each other, and are generally in the same plane. Thus, the optical axes of the lenses are spaced apart, and the lenses project two complete images onto detector 9. The images are non-coincident, i.e. they are laterally-displaced, due to the spacing of the lenses. The separation of the lenses, and of the images, is exaggerated in FIG. 1, for purposes of clarity of illustration.

The detector can be a photographic film. It can also be any other suitable recording means, such as a thermoplastic material coated with a photoconductor. Such materials are commercially available. The invention is not limited to any particular recording means.

The portions of the images which overlap each other, on detector 9, interfere to produce an image which is modulated by a random interference pattern. This image appears as a set of speckles, and is commonly called a "speckle pattern". When the object is deformed, the speckle pattern is slightly modified. The speckle pattern obtained while the object is deformed can be compared with the speckle pattern for the undeformed object, to yield information on the condition of the object. The two speckle patterns can be made to interfere directly, on a photographic film, to produce a "beat" fringe pattern which represents the relative deformation of the two regions.

The amount of shearing depends on the separation of the two lenses. Moving the lenses away from each other increases the distance between the images at the image plane. The amount of shearing can thus be easily and continuously adjusted by varying the position of the lenses. The lenses can be moved together and apart by any suitable mechanical means. For example, the lenses can be mounted on a slide that can be adjusted by a screw. In FIG. 1, reference numeral 8 designates any such adjustment device.

The lenses 5 and 7 can be two complete lenses, or they can be partial lenses. Each lens, or portion of a lens, produces a complete image in the image plane, i.e. the plane of the detector.

Figure 2:
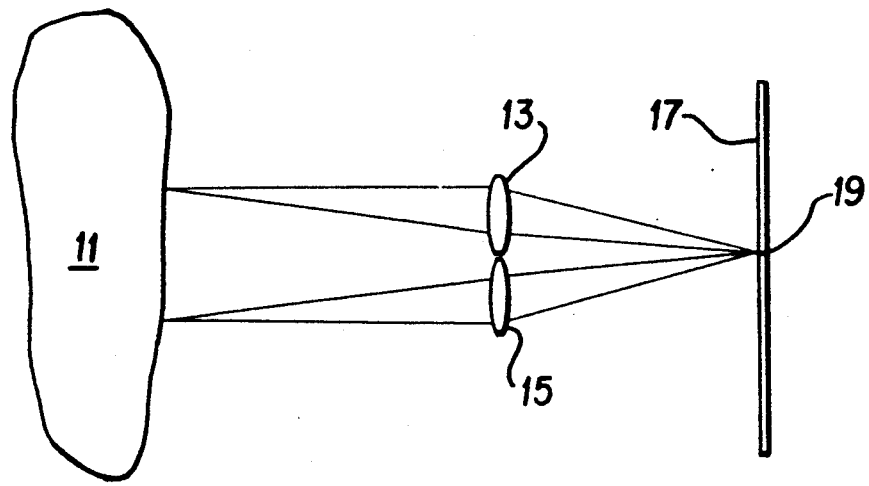
FIG. 2 is a schematic diagram of the present invention, showing how the apparatus combines reflected light from two distinct points on the test object.

Because the above-described apparatus forms two laterally-displaced images of the same object, it is also true that the system causes light from a given point on the object to interfere with light from some other point on the object. Thus, the rays shown in FIG. 1 can be redrawn in the equivalent configuration shown in FIG. 2. FIG. 2 explicitly and schematically shows that two distinct points on object 11 are mapped into a single point 19 on detector 17. Each point of the interference pattern at detector 17 therefore represents the interference of light from a unique pair of distinct points on the object. In FIG. 2, lenses 13 and 15 are shown as two, complete, laterally-displaced lenses. The source of coherent light is not shown, for simplicity of illustration.

When the object is deformed, the two points on the object are relatively displaced. This relative displacement produces a relative phase change, which slightly modifies the speckle pattern. One can thus compare the speckle pattern obtained while the object is deformed with the pattern obtained when the object is not deformed, to derive information on displacement.

The direction of shearing is the same as the direction of separation of the lenses. Thus, if the lenses are located at different positions along a vertical plane, as shown schematically in FIG. 1, then the sheared images will be displaced vertically from each other along the image plane. The configuration of FIG. 1 therefore permits comparison of the deformation in two vertically separated regions. One could also position the lenses in a horizontal plane, to separate the images horizontally.

Figure 3:
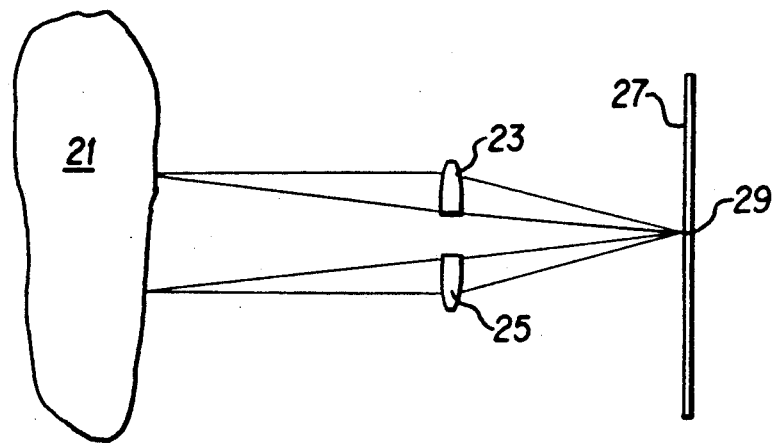
FIG. 3 is a schematic diagram, similar to FIG. 2, but wherein the lenses are both partial lenses.

The lenses in FIG. 2 need not be complete lenses; they can be partial lenses as illustrated in FIG. 3. In that figure, lens 23 and lens 25 are partial lenses. Light from two distinct points on object 21 passes through partial lenses 23 and 25, and converges at point 29 on detector 27. Each partial lens can be one-half, or three-quarters, or some other fraction of a full lens. Note that a portion of a lens is capable of forming a complete image of the object. The use of partial lenses allows the two optical axes of the lenses to be closely spaced. This is necessary when a small amount of shearing is needed. The configuration of FIG. 3 is otherwise equivalent to that of FIG. 2.

Figure 4:
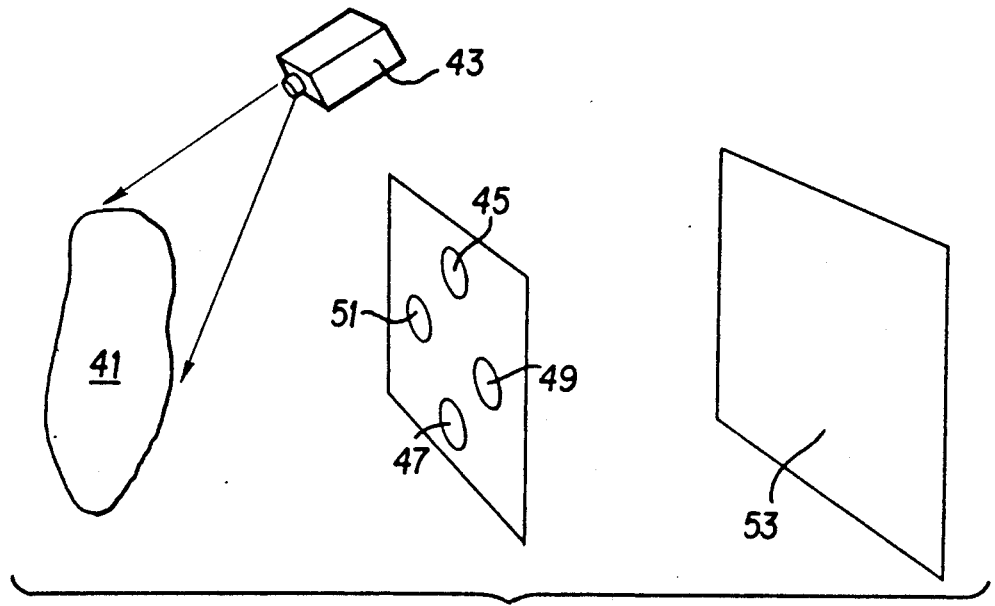
FIG. 4 is a schematic diagram showing a four-lens system which allows simultaneous comparison of two vertically separated regions and two horizontally separated regions.

It is possible to compare simultaneously two vertically separated regions and two horizontally separated regions by using a four-lens system, as shown in FIG. 4. Test object 41, illuminated with light from laser 43, is imaged by an imaging system which includes four lenses, designated by reference numerals 45, 47, 49, and 51. The image is formed on detector 53. The lenses are shown arranged in the same plane, and are held in place by a suitable mounting means (not shown). The lens-pair 45 and 47 brings the two images from two vertically separated regions to meet and interfere in the detector plane, thus allowing the deformation of two vertically separated regions to be compared. Likewise, the horizontally separated lens-pair 49 and 51 allows two horizontally separated regions to be compared. All the interfering image pairs can be recorded on the same detector simultaneously. The mixed information can be subsequently separated by means of the optical spatial filtering schematically illustrated in FIG. 5, and described below.

Other combinations of lenses are possible. For example, it is possible to arrange three lenses in a line. Each pair of lenses will generate a pair of laterally-sheared images. The relative spacing between each pair determines the amount of shearing. This invention can therefore be generalized to multiple-lens systems for simultaneous comparison of multiple object regions.

There are four preferred methods of comparing the deformed and undeformed speckle patterns. These are (1) double exposure, (2) real-time, (3) sandwich, and (4) time-integrated methods. In each method, the comparison of two slightly different speckle patterns produces a "beat" fringe pattern which represents the relative displacement between the two regions of the same object or of two different objects.

In the double exposure method, a photographic plate, or thermoplastic material or other recording medium, in the image plane of FIG. 1, is doubly exposed, first with the object in the undeformed state and then with the object in a deformed state (or additionally deformed if the first exposure is taken when the object is under some deformation). The doubly exposed photographic transparency, after being developed, records the superposition of the two speckle patterns for the deformed and undeformed states.

Figure 5:
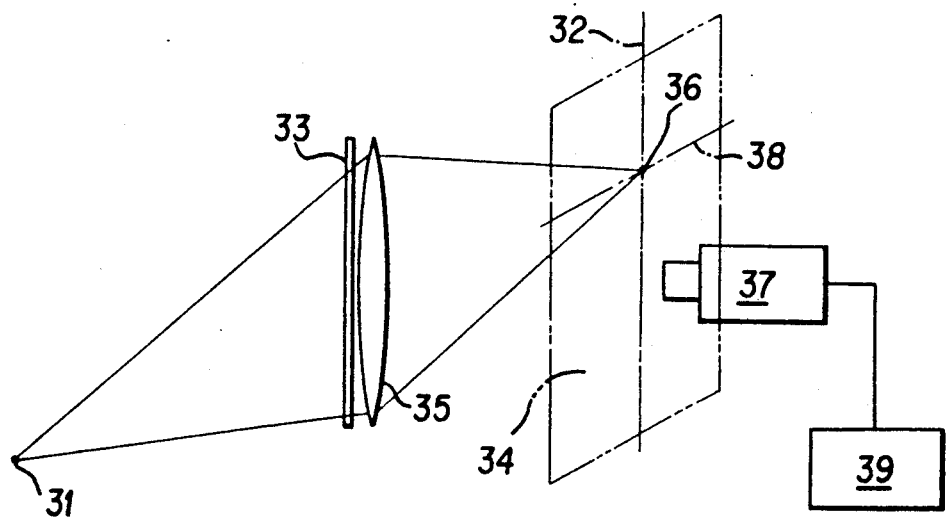
FIG. 5 is a schematic diagram showing an arrangement for viewing the fringe pattern recorded by the present invention.

An apparatus for viewing the results of the double exposure method is illustrated schematically in FIG. 5. Transparency 33 is illuminated by a point white light source 31, which need not be a laser. Lens 35 focuses the light passing through the transparency, onto camera 37. The camera is connected to computer 39 which analyzes and/or stores the images. One observes a "beat" fringe pattern when the transparency is illuminated as shown in FIG. 5. The "beat" fringe lines correspond to areas of absence of speckles which will not diffract the illuminating light. The apparatus effectively comprises a high-pass optical filter, using essentially the same principle as described in the above-cited article from *Optical Engineering*, May/June 1982, at pages 392–3. Thus, a dark fringe pattern is observed by eye or preferably by a video camera. The video camera allows the image to be digitized for storage or further analysis by the computer. The computer can be programmed to compare the two images, and to generate graphic representations of the test object.

FIG. 5 also illustrates schematically the apparatus for performing optical Fourier filtering. Lens 35 serves as a transforming lens. A Fourier transform is a transformation from a spatial domain into a frequency domain. In FIG. 5, the plane 34, which is parallel to the transforming lens and which contains point image 36 of light source 31, is the frequency plane. The frequency plane is, of course, a theoretical construct, and is not a physical component. The various spatial frequencies of the speckle pattern recorded in the transparency 33 are separated in the frequency plane. Light transmitted by the areas of zero and low spatial frequency is not diffracted and hence is displayed at and around the image point, whereas light transmitted by areas of higher spatial frequencies is diffracted and is displayed farther away from image point 36 in frequency plane 34. With the camera lens located in frequency plane 34 and displaced from image point 36, the contributions from the areas of absence of speckles, i.e. zero or low spatial frequency, do not enter the video camera and hence these areas are observed as dark fringes in the output video image. The areas of high spatial frequency are observed as light fringes.

It should be noted that spatial frequency is a vector quantity which has both magnitude and direction. The magnitude of the frequency is the number of fringes per unit length, whereas the direction of the frequency refers to the direction of the spacing. Fringes can be more closely spaced along one direction and less closely spaced along another.

It is the directional property of the spatial frequency of the speckle patterns which allows the separation of the mixed information recorded by the four-lens system of FIG. 4. This statement is true because the direction of the spatial frequency of the speckles recorded by a dual-lens system depends on the orientation of the separation of the lenses. If the two lenses are separated in the vertical direction, the frequency direction of the speckles produced by the interference of the two images will have a dominant component in the vertical direction. Thus, to read out a fringe pattern recorded by a vertically separated lens-pair, the lens of the video camera 37 should be positioned vertically away from the image point in frequency plane 34 of FIG. 5, i.e. the camera should be displaced along vertical line 32. Likewise, the camera lens should be displaced along horizontal line 38 if the recording lenses are separated horizontally. In general, the interference pattern generated by a pair of lenses should be viewed along an axis corresponding to the axis of separation between the pair of lenses.

In the real-time method of viewing interference patterns, a photographic plate in the image plane of FIG. 1 is exposed, while the object is not deformed, and then developed in place (or developed and then returned to its original position). With the object illuminated by laser light and when the object is deformed, a "live" fringe pattern will be observed behind the plate.

In the sandwich method, the two speckle patterns (for the deformed and undeformed states) formed in the image plane of FIG. 1 are recorded on two separate photographic plates. The two plates, after development, are placed in contact and aligned. A fringe pattern is observed when one employs an optical process of FIG. 5, similar to the double exposure method.

The time-integrated recording method is only applicable when the object is undergoing steady state vibration. In this method, a photographic plate in the image plane of FIG. 1 is continuously exposed with an exposure time equal to several periods of vibration of the object. Since in steady state sinusoidal vibration the object spends more time near the peaks and valleys of the vibrational amplitude (because the velocity is near zero at these points), the contribution from the extreme points dominate. This method is almost equivalent to the double-exposure method with one of the two exposures being made at the peak and the other at the valley of the vibrational displacement. The time-integrated photographic recording produces a fringe pattern representative of the relative vibrational amplitude of the two regions. The fringe pattern is viewed with the optical arrangement of FIG. 5.

The invention described above has many advantages not enjoyed by conventional holography. The invention requires a very simple optical setup. Unlike holography, which requires precise alignment of an object beam and a reference beam, the illustrated apparatus requires only a source of light, a detector, an object, and a pair of lenses. Each beam of light from the laser is reflected only once, so the optical path lengths are held to a minimum. Because the apparatus responds to differences between different points on the object, and does not require an external reference beam as needed in holography, the method is relatively insensitive to environmental disturbances. Thus, the system of the present invention does not require special vibration isolation which is needed in conventional holography. When comparing the relative deformation of two regions of the same object, the device is relatively insensitive to rigid body motion. Thus it does not produce the confusing fringes which occur in conventional holography due to rotation of the object.

The present invention also enjoys the advantage of not requiring a laser having a high degree of coherence. Because the present invention, unlike holography, does not require object and reference beams, and mirror systems to direct these beams, the coherent length requirement is greatly reduced. It is possible to practice the invention even with partially coherent light, provided that the light can be made to interfere as described above.

Another advantage of the present invention, as compared with conventional holography, is that it can be used with recording media having resolution capability which is much lower than the high-resolution media required for holography. As explained in detail in co-pending application Ser. No. 129,709, filed Dec. 7, 1987, the spatial frequency of a fringe pattern produced by interference of light beams from two point sources is, in the small-angle limit, equal to the angle formed by the interfering beams divided by the wavelength of the light. In the present invention, if the lenses are properly placed, the average angle between interfering beams can be made very small, and the spatial frequency of the resulting pattern will itself be relatively small. Reducing the spatial frequency of the interference pattern reduces the need for high-resolution film. The required resolution capacity of the detector, in the present invention, is much less than what is needed with conventional holography.

The present invention also enjoys advantages not shared by other methods of shearography. Because the invention uses two lenses, more light is captured by the lens system and transmitted to the detector. Also, the light is not attenuated by an extra optical element, such as a wedge, placed in its path. Thus, with the present invention, it is possible to reduce the intensity of the light source and/or to use shorter exposure times. This advantage is partially offset if only partial lenses are used, as discussed above.

By use of a multiple-lens system, as described above, the present invention allows multiple object regions to be compared.

The present invention produces undistorted images. Unlike the case of the wedge system described above, image distortion is not part of the "price" of producing the shearing effect.

Unlike the shearography systems of the prior art, the shearing in the present invention is continuously adjustable. As described above, the amount of shearing can be varied simply by varying the separation of the lenses.

With the present invention, it is possible to analyze points on the object that are comparatively far apart. With the wedge system for generating shearing effect, one cannot do the same, because analysis of distant points requires a wedge having a very large angle. A large-angle wedge causes intolerable distortion in the image. With the present invention, not only can one analyze differential displacements of distinct points on the same object, but one can even place two objects in front of the lenses and compare the deformations on different objects.

Although the invention has been described with respect to particular embodiments, it is understood that modifications are possible. As described above, full lenses or partial lenses can be used. The types of detectors used can be varied. These modifications should be considered within the spirit and scope of the following claims.

What is claimed is:

1. A method of analyzing a test object, comprising the steps of:
   (a) directing a beam of at least partially coherent light onto the object, to obtain a reflected beam,
   (b) passing the reflected beam simultaneously through a pair of optical elements, the optical elements being spaced apart from each other and having distinct optical axes, so that the optical elements produce a pair of laterally-displaced images of the object on a detecting means, the detecting means being singly exposed such that said images therefore with each other to form a single interference pattern,
   (c) deforming the object, and repeating steps (a) and (b) while the object is deformed, and
   (d) comparing the interference patterns formed during the two iterations of step (b).

2. The method of claim 1, wherein the optical elements include at least portions of lenses.

3. The method of claim 1, wherein the detecting means comprises a photographic film.

4. The method of claim 1, wherein the comparing step comprises the step of analyzing the images by computer.

5. The method of claim 1, wherein the directing step if preceded by the step of adjusting the distance between the optical elements.

6. A method of analyzing a test object, comprising the steps of:
   (a) directing a beam of at least partially coherent light onto the object, to obtain a reflected beam,
   (b) passing the reflected beam simultaneously through a plurality of optical elements, the optical elements being spaced apart from each other and having distinct optical axes, so that pairs of the optical elements produce corresponding pairs of laterally-displaced images of the object on a detecting means, the detecting means being single exposed such that said images interfere with each other to form a single interference pattern,
   (c) deforming the object, and repeating steps (a) and (b) while the object is deformed, and
   (d) comparing the interference patterns formed during the two iterations of step (b).

7. The method of claim 6, wherein the comparing step includes the step of viewing the interference patterns along an axis corresponding to the axis of separation between each pair of lenses.

* * * * *